(12) United States Patent
Miau

(10) Patent No.: US 12,555,928 B2
(45) Date of Patent: Feb. 17, 2026

(54) ANTENNA SWITCHING

(71) Applicant: Hewlett-Packard Development Company, L.P., Spring, TX (US)

(72) Inventor: Ruei-Ting Miau, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 486 days.

(21) Appl. No.: 18/175,486

(22) Filed: Feb. 27, 2023

(65) Prior Publication Data

US 2024/0291170 A1    Aug. 29, 2024

(51) Int. Cl.

| H01Q 21/30 | (2006.01) |
|---|---|
| G01S 13/04 | (2006.01) |
| H01Q 1/22 | (2006.01) |
| H01Q 5/25 | (2015.01) |
| H04B 7/06 | (2006.01) |

(52) U.S. Cl.
CPC ............. *H01Q 21/30* (2013.01); *G01S 13/04* (2013.01); *H01Q 1/22* (2013.01); *H01Q 5/25* (2015.01); *H04B 7/0608* (2013.01)

(58) Field of Classification Search
CPC . H01Q 21/30; H01Q 1/22; H01Q 5/25; G01S 13/04; H04B 7/0608
See application file for complete search history.

(56) References Cited

U.S. PATENT DOCUMENTS

| 7,653,020 | B2 | 1/2010 | Roberts | |
|---|---|---|---|---|
| 12,225,497 | B2 * | 2/2025 | Caporal Del Barrio | H04L 25/0228 |
| 2005/0163042 | A1 | 7/2005 | Roberts | |
| 2013/0310109 | A1 * | 11/2013 | Filipovic | H01Q 3/24 |
| | | | | 455/553.1 |
| 2021/0066786 | A1 * | 3/2021 | Yarga | H01Q 1/243 |
| 2021/0075090 | A1 * | 3/2021 | Yarga | H01Q 1/241 |

(Continued)

FOREIGN PATENT DOCUMENTS

| CN | 112630725 A | 4/2021 |
|---|---|---|
| KR | 10-2022-0005306 A | 1/2022 |
| WO | 2022/010115 A1 | 1/2022 |

OTHER PUBLICATIONS

Botler, Leo et al., Direction Finding with UWB and BLE: A Comparative Study, Dec. 2020, IEEE, 2020 IEEE 17th International Conference on Mobile Ad Hoc and Sensor Systems (MASS), pp. 44-52 (Year: 2020).*

*Primary Examiner* — Lewis G West (74) *Attorney, Agent, or Firm* — Quarles & Brady LLP (57) ABSTRACT

Antenna switching can improve wireless connectivity of a computing device by selectively enabling one or more antenna modules. The antenna modules can be positioned along edges of the computing device to reduce the likelihood that multiple antenna modules are obstructed at once. Each antenna module can include an ultra-wideband (UWB) sensor and communication antenna (e.g., a Wi-Fi antenna) for wireless connectivity. A radio frequency (RF) controller of the computing device causes the UWB sensors to perform a UWB handshake with a wireless access point for position detection. Each UWB sensor is further configured to detect an obstruction proximal to the corresponding antenna module based on time-of-flight (ToF) and angle-of-arrival (AoA) measurements. In some cases, the RF controller can also perform gesture detection by the UWB sensors.

20 Claims, 5 Drawing Sheets

(56) References Cited

U.S. PATENT DOCUMENTS

| | | | |
|---|---|---|---|
| 2021/0088645 A1 | 3/2021 | Casamassima et al. | |
| 2021/0096515 A1* | 4/2021 | Ruaro | G04G 21/04 |
| 2021/0400614 A1* | 12/2021 | Lee | G01S 13/765 |
| 2022/0094053 A1* | 3/2022 | Jiang | H01Q 5/42 |
| 2022/0141657 A1* | 5/2022 | Hammerschmidt | H04L 25/0224 |
| | | | 726/3 |
| 2022/0201600 A1* | 6/2022 | Reshef | H04W 72/02 |
| 2022/0263251 A1* | 8/2022 | Nabki | H01Q 9/40 |
| 2022/0303819 A1 | 9/2022 | Alex et al. | |
| 2022/0353633 A1* | 11/2022 | Kim | H04W 4/02 |
| 2022/0390541 A1* | 12/2022 | Chen | G01S 5/04 |
| 2022/0393351 A1* | 12/2022 | Wu | H01Q 21/30 |
| 2023/0065673 A1* | 3/2023 | Tertinek | G01S 5/12 |
| 2023/0309058 A1* | 9/2023 | Lee | G01S 13/02 |
| 2023/0327720 A1* | 10/2023 | Casamassima | H04B 1/7163 |
| | | | 375/140 |
| 2023/0387979 A1* | 11/2023 | Scott | H04B 7/0877 |
| 2024/0098682 A1* | 3/2024 | Studerus | H04B 1/7163 |
| 2024/0119943 A1* | 4/2024 | Kang | G10L 17/02 |

* cited by examiner

ANTENNA SWITCHING

BACKGROUND

Computing devices, particularly ultra-wideband (UWB) and Wi-Fi-enabled devices, can support antenna switching to provide band coverage of multiple communication standards and frequencies. Examples of computing devices include, but are not limited to, mobile phones, tablets, base stations, network access points, customer-premises equipment (CPE), laptops, and wearable electronics.

DETAILED DESCRIPTION

Computing devices can suffer a loss or degradation of wireless connectivity when the device is folded or repositioned such that an antenna is obstructed. For example, a tabletop surface or a user's hands can block or attenuate radio frequency (RF) signals transmitted and received by each antenna of a foldable device.

The aforementioned challenges, among others, are addressed in some examples by the disclosed techniques for antenna switching by a computing device. Antenna switching can improve wireless connectivity of the computing device by selectively enabling each of a plurality of antenna modules based on proximity to a wireless access point and the presence an obstruction near the device.

Examples described herein provide a computing device capable of antenna switching to maintain wireless connectivity despite obstructions of one or more antenna modules. For example, the computing device can include a first edge; a second edge; a first antenna module including a first ultra-wideband (UWB) sensor and a first communication antenna, wherein the first antenna module is located proximate to the first edge; a second antenna module including a second UWB sensor and a second communication antenna, wherein the second antenna module is located proximate to the second edge; and a controller to: determine a first location of the first antenna module via the first UWB sensor; determine a second location of the second antenna module via the second UWB sensor; and in response to detecting an obstruction to the second communication antenna via first UWB sensor, switch transmission of data from the second communication antenna to the first communication antenna.

In another example, a computing device can include a first housing; a second housing rotatably coupled to the first housing by a hinge; a first antenna module including a first ultra-wideband (UWB) sensor and a first communication antenna, wherein the first antenna module is located in the first housing; a second antenna module including a second UWB sensor and a second communication antenna, wherein the second antenna module is located in the second housing; and a controller to: determine a first location of the first antenna module via the first UWB sensor; determine a second location of the second antenna module via the second UWB sensor; and in response to detecting that an obstruction to the second antenna satisfies a threshold, switch transmission of data from the second communication antenna to the first communication antenna.

In yet another example, a computing device can include a first housing; a second housing rotatably coupled to the first housing; a first antenna module including a first ultra-wideband (UWB) sensor and a first communication antenna, wherein the first antenna module is located in the first housing and proximate to a first edge; a second antenna module including a second UWB sensor and a second communication antenna, wherein the second antenna module is located in the first housing and proximate to a second edge; a third antenna module including a third UWB sensor and a third communication antenna, wherein the third antenna module is located in the second housing and proximate to a third edge; a fourth antenna module including a fourth UWB sensor and a fourth communication antenna, wherein the fourth antenna module is located in the second housing and proximate to a fourth edge; and a controller to: determine a first location of the first antenna module via the first UWB sensor; determine a second location of the second antenna module via the second UWB sensor; determine a third location of the third antenna module via the third UWB sensor; determine a fourth location of the fourth antenna module via the fourth UWB sensor; and in response to detecting that an obstruction to any one of the antenna modules satisfies a threshold, switch transmission of data from the communication antenna of the obstructed antenna module to a communication antenna of one of the unobstructed antenna modules.

FIGS. 1A-1D illustrate various example configurations of a computing device 100 that can implement antenna switching as discussed herein. The computing device 100 includes a first housing 110 and a second housing 120 that are rotatably coupled to each other by a hinge 125. An RF system of the computing device 100 comprises a plurality of antenna modules 130a-130d located in respective edges of the first housing 110 and the second housing 120. The computing device 100 is foldable by rotating the first housing 110 and the second housing 120 about the hinge 125. In certain examples, the computing device 100 can be folded more than 180 degrees about the hinge 125. The RF system of the computing device 100 further includes an RF controller 140 in the first housing 110 or the second housing 120 operably connected to each of the antenna modules 130a-130d. The RF controller 140 is configured for TX and RX operation of the antenna modules 130a-130d, and can perform antenna switching of the modules as discussed herein.

Figure 1A:
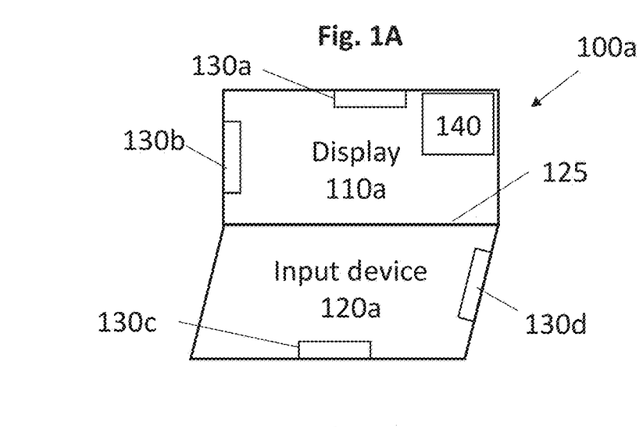
FIGS. 1A-1D illustrate various example configurations of a foldable computing device.

Referring initially to FIG. 1A, the first housing 110a of the computing device 100a can include a display panel, such as a touchscreen panel, or any other type of display panel known in the art. The second housing 120a can include one or more user interface devices (e.g., a keyboard, touch pad, pointing stick, trackball, etc.) for interacting with the computing device 100. The hinge 125 allows the first housing 110a and the second housing 120a to rotate relative to each other, enabling the computing device 100a to be folded into different configurations. Antenna modules 130a-130d are located in four edges of the computing device 100a to provide wireless connectivity in the different foldable configurations. Each of the first housing 110a and the second housing 120a may include a distinct single antenna module 130. As is discussed herein, three or more antenna modules 130a-130d can enhance wireless connectivity of the computing device 100a.

Figure 1B:
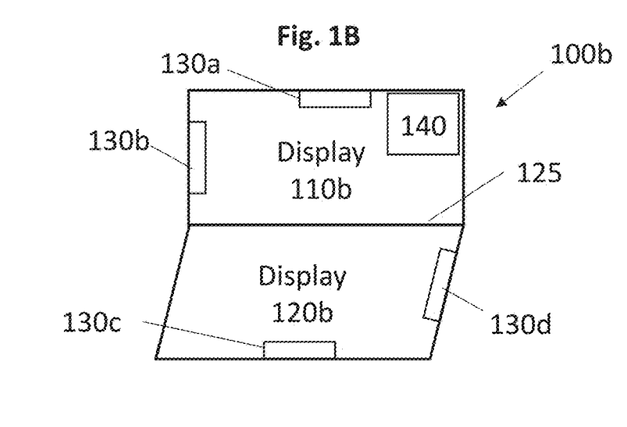

In the computing device 100b of FIG. 1B, the first housing 110b and the second housing 120b can each include a display panel, such as a touchscreen panel, for user input. The first housing 110b and the second housing 120b can include separate display panels, including display panels of a different size, resolution, touchscreen capability, flat panel type (e.g., Light Emitting Diode (LED) display panel, Liquid Crystal Display panel, micro LED, etc.), or the like. The hinge 125 allows the first housing 110b and the second housing 120b to rotate relative to each other, enabling the device to be folded into different configurations. The first housing 110b and the second housing 120b can also share a flexible display panel configured to fold at the hinge 125. Antenna modules 130a-130d are located in four edges of the computing device 100b to provide good wireless connectivity in the different foldable configurations.

Figure 1C:
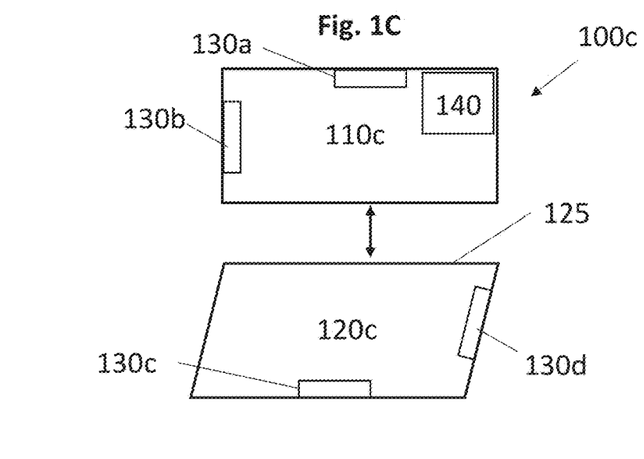

FIG. 1C illustrates an example of the computing device 100c with a detachable first housing 110c and second housing 120c. The first housing 110c and the second housing 120c can each include additional elements as discussed above with reference to any of the previous figures. Antenna modules 130a-130d are located in four edges of the computing device 100c to provide good wireless connectivity in various foldable configurations. The first housing 110c and the second housing 120c are separable at the hinge 125, and when connected, the hinge 125 enables the computing device 100c to be folded into different configurations. In an additional configuration, the second housing 120c (e.g., comprising a keyboard) can be disconnected, and the first housing 110c used as a tablet device. The computing device 100c includes a pair of antenna modules 130a-130b in the first housing 110c for wireless connectivity when the second housing 120c is detached. The first housing 110c and/or the second housing 120c can include additional antenna modules 130c-130d located in respective edges of each of the housings. In some cases, the second housing 120c does not include any additional antenna modules 130c-130d. The first housing 110c can be a standalone computing device with two or more antenna modules 130a-130b for wireless connectivity.

The computing device 100c can gain additional functionality when the second housing 120c is connected to the first housing 110c, such as additional input modes, support for additional communication channels and/or standards, and generally improved wireless connectivity. For example, the computing device 100c can support quad-element multi-input, multi-output (MIMO) communication via the antenna modules 130a-130d of the first housing 110c and/or the second housing 120c. As is discussed herein, the use of additional antenna modules can improve speed and stability of wireless communication even beyond MIMO communication via antenna switching.

Figure 1D:
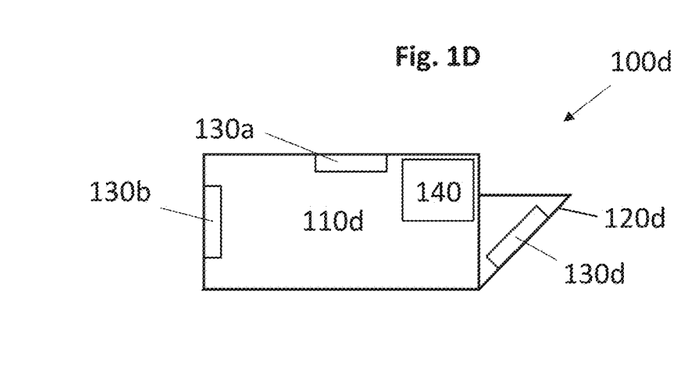

The computing device 100d of FIG. 1D can be a computing device 100 according to any of the previous figures. The first housing 110d and the second housing 120d are folded about the hinge 125 such that the first housing 110d stands above the second housing 120d in an upright configuration. Antenna modules 130a-130d are located in four edges of the computing device 100d. (For ease of illustration, a third one of the antenna modules 130c is not shown behind the first housing 110d.)

Additional configurations of the computing device 100d can include a closed configuration wherein the first housing 110d and the second housing 120d are folded together, and an open configuration wherein the first housing 110d and the second housing 120d are unfolded and lie in a generally flat, parallel configuration. The computing device 100d can also be in a tent configuration wherein the first housing 110d and the second housing 120d are folded into a triangular shape. Those skilled in the art will appreciate that FIGS. 1A-1D do not disclose every possible example of the computing device 100, and that the teachings discussed herein are applicable to computing devices in a wide variety of configurations.

Figure 2:
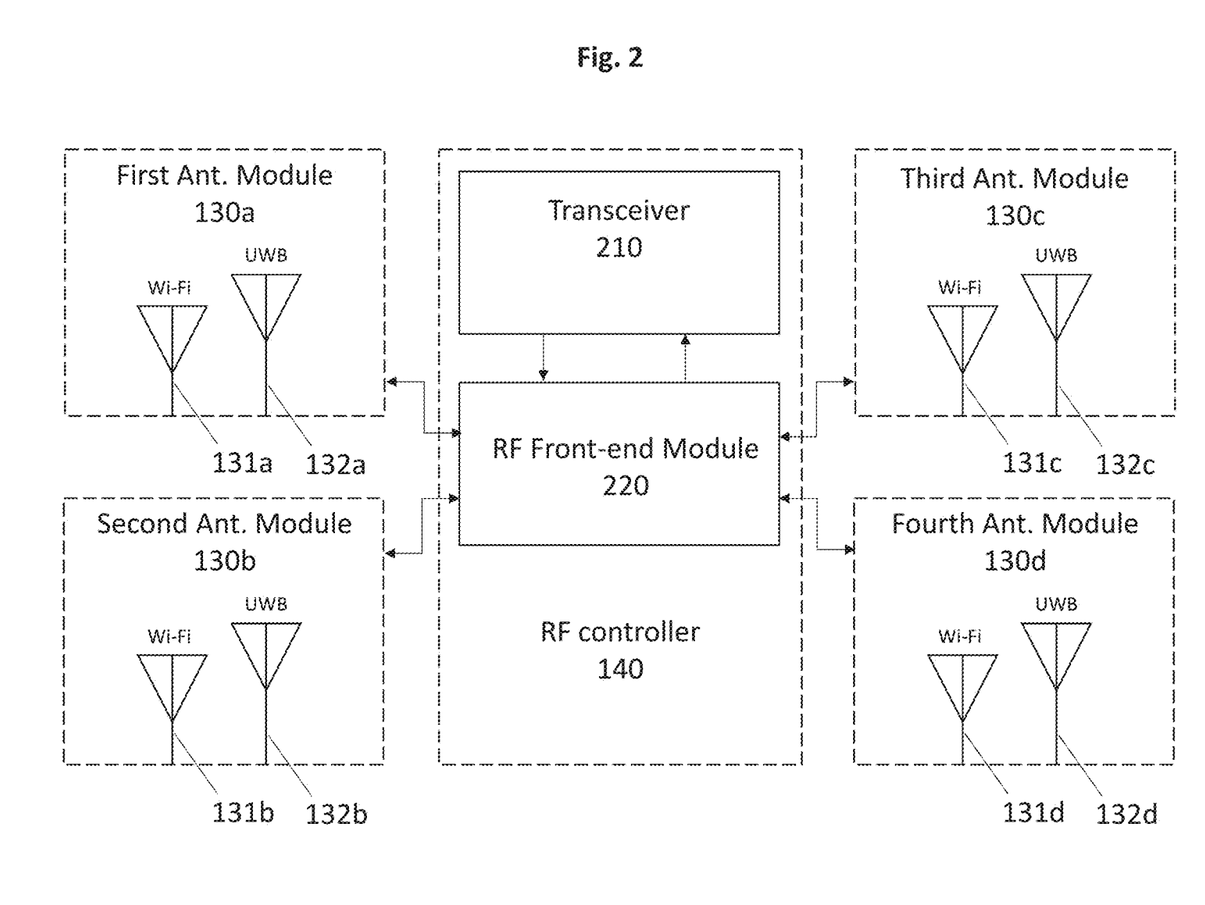
FIG. 2 is a schematic representation of an RF system of the computing device according to one example.

FIG. 2 is a schematic illustration of the RF system of the computing device 100. The RF system comprises a RF controller 140 and the plurality of antenna modules 130a-130d. The RF controller 140 includes a RF integrated circuit (RFIC), such as a transceiver 210, and a RF front-end module (RF FEM) 220 which is communicatively coupled to the transceiver 210. The RF controller 140 controls TX and RX operation of a first antenna module 130a and a second antenna module 130b, which are connected to the RF FEM 220. The RF controller 140 can further control TX and RX operation of a third antenna module 130c and a fourth antenna module 130d as shown by FIG. 2.

The first antenna module 130a includes a first communication antenna 131a and a first UWB sensor 132a. The second antenna module 130b includes a second communication antenna 131b and a second UWB sensor 132b. The third antenna module 130c includes a third communication antenna 131c and a third UWB sensor 132c. The fourth antenna module 130d includes a fourth communication antenna 131d and a fourth UWB sensor 132d. The various communication antennas 131a-131d can be Wi-Fi antennas configured for Wi-Fi operation as discussed herein. The communication antennas 131a-131d and RF controller 140 can also support other WWAN and/or WLAN communication standards and frequencies. (e.g., Bluetooth, LTE, 5G NR, and the like.) The various UWB sensors 132a-132d are used for ultra-wideband communication and two-way ranging by the computing device 100, and are communicatively coupled with the RF controller 140 via the RF FEM 220.

The transceiver 210 and RF FEM 220 include circuitry for processing RF signals received and transmitted by the antenna modules 130a-130d, such as signal conditioning and filtering stages configured according to the type and frequency of the RF signals. Although FIG. 2 illustrates one example of an RF system, the teachings herein are broadly applicable to various implementations of an RF system of a computing device 100. The transceiver 210 and the RF FEM 220 can be implemented with GaAs, silicon-on-insulator (SOI), or bulk CMOS technologies. In some cases, the transceiver 210, RF FEM 220, and other components of the RF controller 140 can be integrated into a single module. The RF system can also include two or more RF controllers 140, each RF controller capable of operating the antenna modules 130a-130d according to a different communication standard.

The RF system of FIG. 2 is operable in multiple frequency bands across various communication standards. For example, the RF controller 140 can support TX and RX operation in Wi-Fi frequency bands from 2.4-2.5 GHz and 5-7.125 GHz, respectively. The RF controller 140 can also support UWB TX and RX via the UWB channel 5 frequency band and UWB channel 9 frequency band. The UWB channel 5 frequency band has a center frequency of about 6.5 GHz and a bandwidth of 500 MHz, while the UWB channel 9 frequency band has a center frequency of about 8 GHz and a bandwidth of 500 MHz.

The RF controller 140 can be configured to selectively switch UWB transmissions from the UWB channel 5 frequency band (6.5 GHz) to the UWB channel 9 frequency band (8 GHz) responsive to communication activity in the 5-7.125 GHz Wi-Fi frequency band. This can reduce RF interference and improve wireless connectivity of the computing device 100. In certain examples, the RF controller 140 can selectively switch between additional UWB frequency bands (e.g., UWB channels 7 and/or 11) and/or Wi-Fi frequency bands to reduce RF interference.

Figure 3:
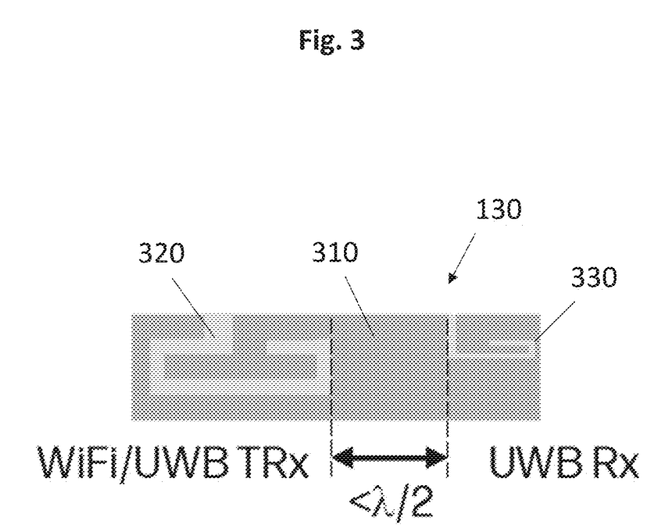
FIG. 3 is an example schematic representation of a combined UWB/Wi-Fi antenna module of the RF system of FIG. 2.

FIG. 3 is a schematic illustration of an example of one of the antenna modules 130. The antenna module 130 is implemented on an antenna printed circuit board (PCB) 310 including a first antenna stripline 320 comprising a communication antenna 131 and a second antenna stripline 330 comprising a UWB sensor 132. The first antenna stripline 320 may be substantially larger than the second antenna stripline 36. For improved UWB connectivity, the first antenna stripline 320 and the second antenna stripline 330 are spaced apart on the antenna PCB 310 by a distance of less than half a wavelength of RF signals of the expected UWB frequency band. This spacing can help to mitigate RF interference such as crossover leakage in the RF FEM 220. For example, the first antenna module 130*a* as configured for operation in the UWB channel 5 frequency band can have a distance between the first antenna stripline 320 and the second antenna stripline 330 of less than 23 mm. This is because the wavelengths of RF signals in the UWB channel 5 frequency band and the UWB channel 9 frequency band are typically greater than 46 mm.

The communication antenna 131 can support Wi-Fi TX/RX and UWB TX/RX operation. The UWB sensor 132 can be configured for RX in various UWB frequency bands. In some examples, additional communication antennas or UWB sensors can be included on the antenna PCB 310, or the antenna module 130 can include multiple antenna PCBs. Because power consumption of the UWB sensors is relatively low, the RF system can include additional antenna modules 130*a*-130*d* as depicted in FIGS. 1A-1D for improved UWB performance.

Figure 4A:
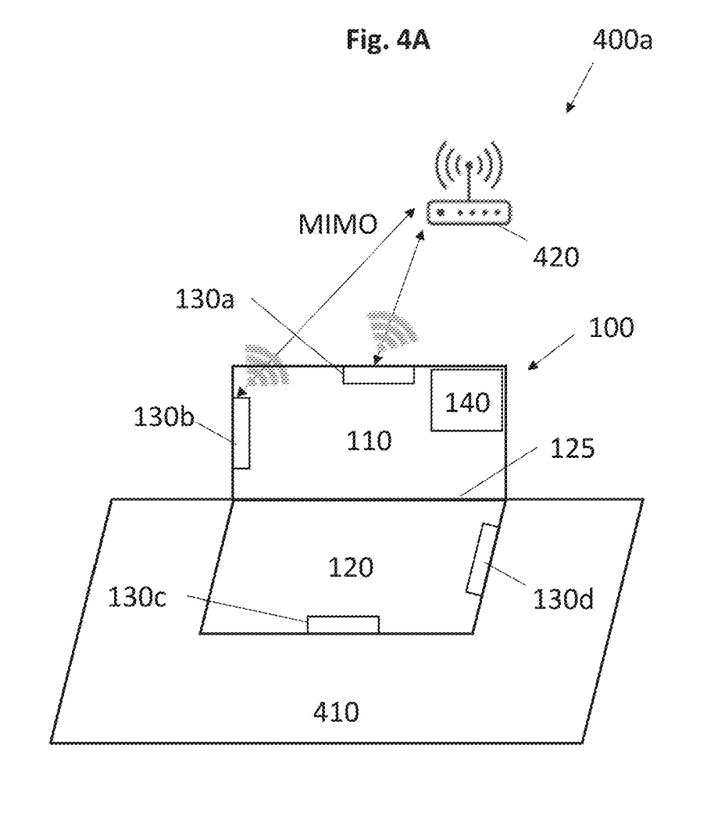
FIGS. 4A-4B illustrate an example of antenna switching by the computing device between a first scenario and a second scenario.
Figure 4B:
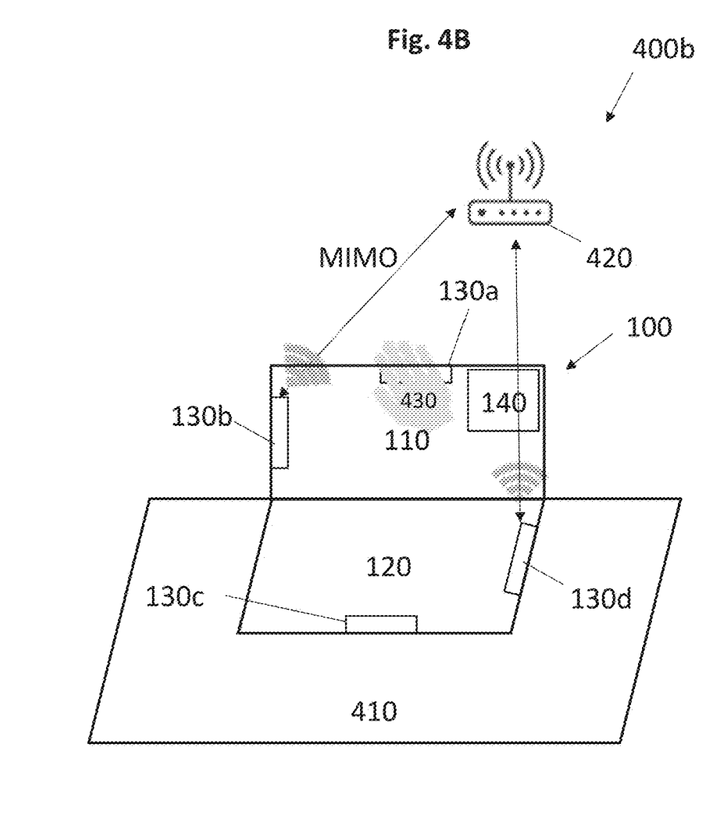

Referring now to FIGS. 4A and 4B, a technique for antenna switching by the computing device 100 is shown.

A first scenario 400*a* for operation of the RF system of the computing device 100 is illustrated by FIG. 4A. In the first scenario 400*a*, the computing device 100 is positioned upon a solid planar surface 410 (e.g., a tabletop) and folded in a notebook configuration. The RF controller 140 transmits a UWB two-way ranging (TWR) signal by each of the antenna modules 130*a*-130*d* to determine a relative location of the antenna modules. When the UWB TWR signal is transmitted by the first one of the antenna modules 130*a*, the signal is received by the various other antenna modules 130*b*-*d* which send a reply signal. (In examples of the computing device with as few as two antenna modules 130*a-b*, the UWB TWR RF signal is received by an opposite one of the antenna modules.) The RF controller 140 repeats this UWB TWR exchange for each of the antenna modules 130*a*-130*d* to calculate a time-of-flight (ToF) delay and/or an angle-of-arrival (AoA) measurement which corresponds to a relative location of each of the antenna modules 130*a*-130*d*. The RF controller 140 can therefore use TWR to update a three-dimensional mapping of the antenna modules 130*a*-130*d* after the foldable configuration of the computing device 100 has been changed or the device has been repositioned. The three-dimensional mapping includes first location information, second location information, third location information, and fourth location information corresponding to locations of each of the antenna modules 130*a*-130*d*.

In addition to determining a location of each of the antenna modules 130*a*-130*d*, the RF controller 140 performs an exchange to identify a relative location of a wireless access point 420 proximal to the computing device 100. The wireless access point 420 can be a Wi-Fi access point, Bluetooth device, cellular base station, or other WWAN or WLAN device supporting UWB communications.

The RF controller 140 exchanges a TWR handshake signal with the wireless access point 420 by one of the antenna modules 130*a*-130*d*. The RF controller 140 determines a relative location of the access point 420 by ToF and/or AoA calculations as discussed herein. Based on the three-dimensional location mapping of the antenna modules 130*a*-130*d* and the relative location of the access point 420, the RF controller 140 initiates a wireless data exchange with the access point 420 using a communication antenna 131 of one of the antenna modules 130*a*-130*d* which is nearest to the access point 420. (i.e., if a distance between the first antenna module 130*a* and the wireless access point 420 is less than a distance between the second antenna module 130*b* and the access point 420, the RF controller 140 can selectively switch transmission of data from the communication antenna 131*b* of the second antenna module 130*b* to the communication antenna 131*a* of the first antenna module 130*a*.) If supported by the wireless access point 420, two or more of the communication antennas 131*a*-131*d* of the antenna modules 130*a*-130*d* can communicate with the access point by MIMO.

A second scenario 400*b* depicting antenna switching by the RF system responsive to an obstruction is illustrated by FIG. 4B. As in the first scenario 400*a*, the computing device 100 is positioned upon the solid planar surface 410 and folded in a notebook configuration. The RF controller 140 transmits a UWB two-way ranging (TWR) signal by each of the antenna modules 130*a*-130*d* to update the three-dimensional location mapping of the antenna modules 130*a*-130*d* as discussed above. The RF controller 140 determines a location of the wireless access point 420 by ToF and/or AoA calculations to establish a wireless connection with the access point 420 by the nearest communication antenna(s) 131*a*-131*d* of the antenna modules 130*a*-130*d*.

During ongoing communication with the wireless access point 420, the RF controller 140 performs TWR signaling by the antenna modules 130*a*-130*d* to detect an obstruction proximal to the computing device 100. For example, in the first scenario 400*a* or the second scenario 400*b*, the RF controller can detect the solid planar surface 410 underneath the second housing 120 proximal to a third antenna module 130*c* and a fourth antenna module 130*d*. The RF controller 140 can determine a type of the obstruction by detecting a TWR reflection by each of the antenna modules 130*a*-130*d*. In the case of the solid planar surface 410, the RF controller 140 can identify the obstruction as a planar surface from a similar ToF delay measured by each of the antenna modules 130*a*-130*d*. Responsive to detecting an obstruction of at least one communication antenna 131, depending on the type of the obstruction and its proximity to any one of the antenna modules 130*a*-130*d*, the RF controller 140 can selectively stop transmission of data from a communication antenna 131 corresponding to the one of the antenna modules 130*a*-130*d* which is currently obstructed and switch the transmission to an alternative communication antenna 131.

The RF controller 140 can iteratively perform any of the functions described herein to adapt to changes in an environment of the computing device 100. For example, the RF controller 140 can perform TWR signaling to detect any new obstructions once per minute or more frequently. The RF controller 140 can implement a time threshold for obstruction detection such that antenna switching only occurs if an obstruction is consistently detected after multiple instances of TWR signaling.

In other cases, the RF controller 140 can update the three-dimensional mapping of the locations of the antenna modules 130a-130d and/or perform the handshake with the wireless access point 420 responsive to feedback, such as acceleration data of an accelerometer, movement detection by a proximity sensor, or other inputs. For example, the RF controller 140 can perform TWR signaling to acquire an updated three-dimensional mapping of the locations of the antenna modules 130a-130d each time the first housing 110 and the second housing 120 of the computing device 100 are opened. The three-dimensional mapping can also be updated when a change in an angle of the hinge 125 exceeds a threshold angle. For example, a change in the hinge angle of more than 10, 20, or 30 degrees can trigger the RF controller 140 to acquire updated locations of each of the antenna modules 130a-130d.

In the second scenario 400b, a hand 430 is currently obstructing the first antenna module 130a located along a top edge of the first housing 110. This scenario could arise, for example, when a user goes to interact with a touchscreen display panel of the computing device 100. The user's hand is detected by the RF controller 140 using TWR reflection, and the RF controller 140 can selectively switch off the communication antenna 131a of the first antenna module 130a and switch on the communication antenna 131c of the third antenna module 130c.

Preference can be given to antenna modules 130b-130d which are the next nearest to the wireless access point 420 after an obstructed one of the antenna modules 130a. (In this example, the communication antenna 131 of the third antenna module 130c is activated because it is nearest to the wireless access point 420 after the second antenna module 130b, which is already in MIMO communication with the access point). In a scenario with multiple obstructions or an obstruction covering multiple antenna modules, the RF controller 140 can continue to transmit by a partially obstructed communication antenna 131 if a fully unobstructed antenna module 130a-130d is not available. The RF controller 140 can have separate detection thresholds for a complete obstruction, partial obstruction, or no obstruction of each antenna module 130a-130d. The detection threshold can be based upon a magnitude of reflected UWB signals received by each antenna module 130a-130d.

Figure 5A:
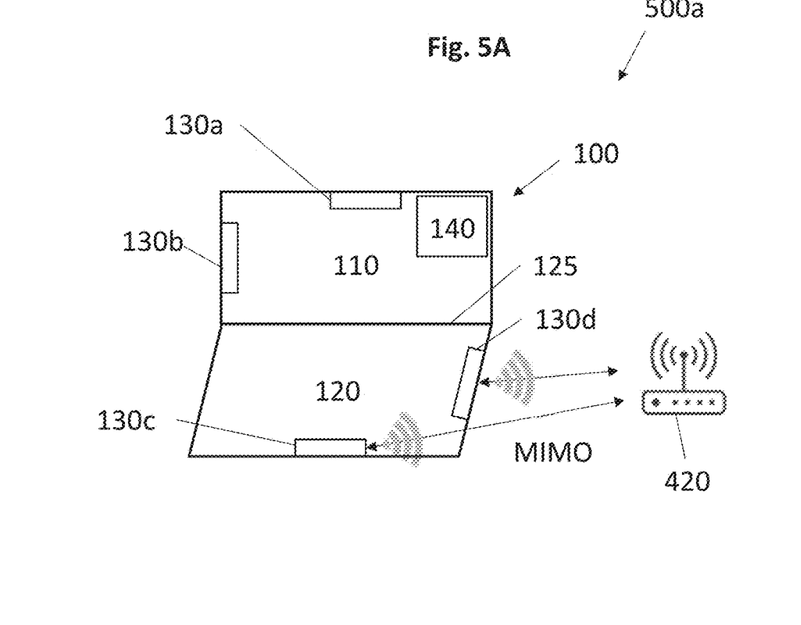
FIGS. 5A-5B illustrate an example of antenna switching by the computing device between a third scenario and a fourth scenario.

FIGS. 5A and 5B show a technique for antenna switching by the computing device 100 according to an additional example. In a third scenario 500a, the computing device 100 has initiated MIMO communication with the wireless access point 420 by the third and fourth antenna modules 130c-130d of the second housing 120. The third and fourth antenna modules 130c-130d are nearest in proximity to the access point 420. In other scenarios, the first or second antenna modules 130a-b may be partially obstructed, as in FIG. 4B. The RF controller 140 of the computing device 100 uses TWR signaling during ongoing communication with the wireless access point 420 to update the location mapping of the antenna modules 130a-130d and switch between the antenna modules 130a-130d responsive to any obstruction being detected.

Figure 5B:
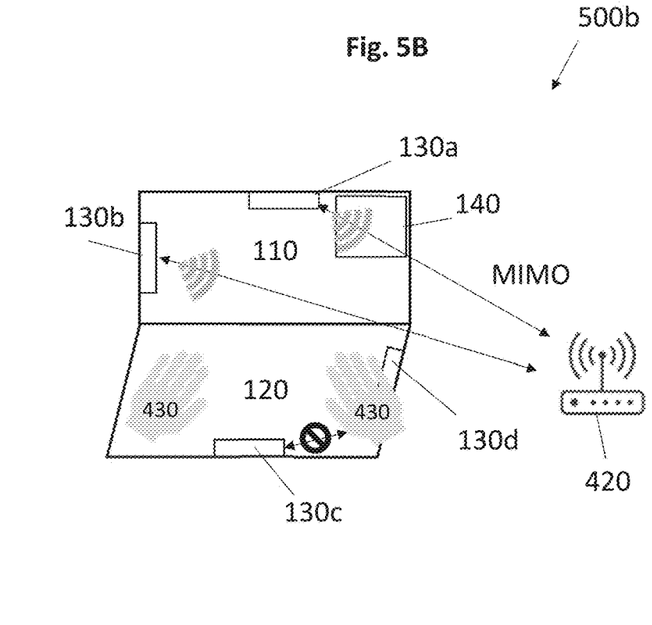

In a fourth scenario 500b of FIG. 5B, the user's hands 430 are obstructing the third and fourth antenna modules 130c- 130d of the second housing 120, such as while typing on a keyboard. During ongoing communication with the wireless access point 420, the RF controller 140 performs TWR signaling by each of the antenna modules 130a-130d to detect the hands 430 proximal to the second housing 120. The RF controller 140 can determine a type of the obstruction by comparing a magnitude and a delay of a plurality of TWR reflections from the hands 430 by each UWB sensor 132. For example, the RF controller 140 can measure TWR reflections with a similar ToF delay but different magnitudes at each of the antenna modules 130a-130d. Based on the type of the obstruction and proximity to the third and fourth antenna modules 130c-130d, the RF controller 140 can stop transmitting from the communication antennas 131c-131d corresponding to the third and fourth antenna modules 130c-130d which are currently obstructed. By process of elimination, the RF controller 140 can identify the first and second antenna modules 130a-130b as having two unobstructed communication antennas 131a-131b which are nearest to the wireless access point 420, and switch data transmission by the RF system to the two unobstructed communication antennas 131a-131b.

The RF controller 140 can also perform gesture recognition responsive to detecting that the obstruction proximal to any one of the antenna modules 130a-130d is a user's hand 430. The RF controller 140 transmits a UWB TWR signal by the communication antenna 131 and receives a reflected UWB TWR signal by the UWB sensor 132 of one of the antenna modules 130a-130d. The RF controller 140 iteratively transmits the UWB TWR signal from each of the antenna modules 130a-130d to receive reflected UWB TWR signals and calculate a time-of-flight (ToF) delay corresponding to a distance between the obstruction and each of the antenna modules 130a-130d. The RF controller 140 uses the ToF delay to determine a location of the obstruction and identify a type of the obstruction (e.g., planar surface, hand). Based on a magnitude of the reflected UWB TWR signal, the RF controller 140 can determine a severity of the obstruction (full, partial, none) by comparing the magnitude to one or more preset obstruction detection thresholds. In other examples, an obstruction detection threshold can be calibrated when a known obstruction is present, such as while the computing device 100 is resting upon a planar surface 410.

Responsive to identifying the obstruction as a hand 430, the RF controller 140 can repeatedly perform TWR signaling by the antenna modules 130a-130d to generate gesture information of the hand 430. The RF controller 140 can also compare two or more angle-of-arrival measurements to detect a phase difference corresponding to a direction of the hand 430. The RF controller 140 can include a coprocessor for gesture recognition, or the gesture information can be provided to one or more processors of the computing device 100 for interpretation. The gesture information can be used as an input to a user interface of the computing device 100, wherein the computing device 100 is configured to perform one or more operations (e.g., updating the user interface) when the gesture input is received. When multiple obstructions are present near the computing device 100, the RF controller 140 can determine a location of each obstruction and identify one or more obstructions which are a hand 430. The RF controller 140 can then provide gesture information to the processor for each hand 430.

The principles of the examples described herein can be used for any other system or apparatus including mobile phones, tablets, base stations, network access points, customer-premises equipment (CPE), laptops, and wearable electronics.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain examples include, while other examples do not include, certain features, elements and/or states. Thus, such conditional language is not generally intended to imply that features, elements and/or states are in any way required for one or more examples or that one or more examples necessarily include logic for deciding, with or without author input or prompting, whether these features, elements and/or states are included or are to be performed in any particular example.

What is claimed is:

1. A computing device, comprising:
   a first edge;
   a second edge;
   a first antenna module including a first ultra-wideband (UWB) sensor and a first communication antenna, wherein the first antenna module is located proximate to the first edge;
   a second antenna module including a second UWB sensor and a second communication antenna, wherein the second antenna module is located proximate to the second edge; and
   a controller to:
      determine a first location of the first antenna module via the first UWB sensor;
      determine a second location of the second antenna module via the second UWB sensor;
      detect an obstruction to the second communication antenna via the first UWB sensor by sensing, by a plurality of time-of-flight measurements, that the obstruction is a substantially planar surface or that the obstruction is a hand; and
      responsive to detecting the obstruction to the second communication antenna via the first UWB sensor, switch transmission of data from the second communication antenna to the first communication antenna.

2. The computing device according to claim 1, wherein the controller is to perform two-way ranging (TWR) to determine a third location of a wireless access point.

3. The computing device according to claim 2, wherein the controller is to switch transmission of data from the first communication antenna to the second communication antenna in response to a distance between the first location and the third location being less than a distance between the second location and the third location.

4. The computing device according to claim 2, further comprising:
   a third edge; and
   a third antenna module including a third UWB sensor and a third communication antenna, wherein the third antenna module is located proximate to the third edge.

5. The computing device according to claim 4, wherein the controller is to perform multi-input, multi-output (MIMO) communication with the wireless access point via two unobstructed communication antennas which are nearest to the wireless access point.

6. The computing device according to claim 1, wherein detecting the obstruction to the second communication antenna via the first UWB sensor further comprises sensing, by the plurality of time-of-flight measurements, that the obstruction is the substantially planar surface.

7. The computing device according to claim 6, wherein sensing that the obstruction is the substantially planar surface comprises calculating that a delay between a first time-of-flight measurement and a second time-of-flight measurement is below a detection threshold.

8. The computing device according to claim 1, wherein detecting the obstruction to the second communication antenna via the first UWB sensor further comprises sensing, by the plurality of time-of-flight measurements, that the obstruction is the hand.

9. The computing device according to claim 8, wherein sensing that the obstruction is the hand further comprises identifying a gesture by the hand.

10. The computing device according to claim 9, wherein identifying a gesture by the hand comprises detecting a delay in a plurality of time-of-flight measurements and detecting a phase difference between two angle-of-arrival measurements.

11. The computing device according to claim 1, wherein the controller is to switch a frequency band of the first UWB sensor and the second UWB sensor from UWB channel 5 to UWB channel 9 in response to a transmission by the first communication antenna or the second communication antenna.

12. A computing device, comprising:
   a first housing;
   a second housing rotatably coupled to the first housing by a hinge;
   a first antenna module including a first ultra-wideband (UWB) sensor and a first communication antenna, wherein the first antenna module is located in the first housing;
   a second antenna module including a second UWB sensor and a second communication antenna, wherein the second antenna module is located in the second housing; and
   a controller to:
      determine a first location of the first antenna module via the first UWB sensor;
      determine a second location of the second antenna module via the second UWB sensor; and responsive to detecting that an obstruction to the second communication antenna satisfies a threshold, switch transmission of data from the second communication antenna to the first communication antenna.

13. The computing device of claim 12, wherein the first antenna module and the second antenna module are located proximate to an edge of the first housing and an edge of the second housing, respectively.

14. The computing device of claim 12, wherein the controller is to iteratively perform two-way ranging (TWR) to update the first location and the second location of the antenna modules.

15. The computing device of claim 13, wherein the controller is to perform two-way ranging to update the first location and the second location of the antenna modules in response to a change in an angle of the hinge satisfying a threshold.

16. The computing device of claim 14, wherein performing two-way ranging comprises detecting a delay in a plurality of time-of-flight measurements or detecting a phase difference between two angle-of-arrival measurements.

17. A computing device, comprising:
a first housing;
a second housing rotatably coupled to the first housing;
a first antenna module including a first ultra-wideband (UWB) sensor and a first communication antenna, wherein the first antenna module is located in the first housing and proximate to a first edge;
a second antenna module including a second UWB sensor and a second communication antenna, wherein the second antenna module is located in the first housing and proximate to a second edge;
a third antenna module including a third UWB sensor and a third communication antenna, wherein the third antenna module is located in the second housing and proximate to a third edge;
a fourth antenna module including a fourth UWB sensor and a fourth communication antenna, wherein the fourth antenna module is located in the second housing and proximate to a fourth edge; and
a controller to:
determine a first location of the first antenna module via the first UWB sensor;
determine a second location of the second antenna module via the second UWB sensor;
determine a third location of the third antenna module via the third UWB sensor;
determine a fourth location of the fourth antenna module via the fourth UWB sensor; and
responsive to detecting that an obstruction to any one of the antenna modules satisfies a threshold, switch transmission of data from the communication antenna of the obstructed antenna module to a communication antenna of one of the unobstructed antenna modules.

18. The computing device of claim 17, wherein the controller is to perform multi-input, multi-output (MIMO) communication with a wireless access point in response to two of the communication antennas not satisfying the threshold.

19. The computing device of claim 17, wherein detecting that an obstruction to any one of the antenna modules satisfies a threshold comprises sensing, by a delay in a plurality of time-of-flight measurements, that the obstruction is a substantially planar surface.

20. The computing device of claim 17, wherein the controller is to switch a frequency band of the UWB sensors in response to a transmission by any one of the communication antennas.

* * * * *